United States Patent [19]
Scharlack

[11] 3,897,114
[45] July 29, 1975

[54] SKID CONTROL SYSTEM

[75] Inventor: Ronald S. Scharlack, San Antonio, Tex.

[73] Assignee: Kelsey-Hayes Company, Romulus, Mich.

[22] Filed: Sept. 3, 1969

[21] Appl. No.: 854,876

[52] U.S. Cl. ............................. 303/21 BE; 303/20
[51] Int. Cl. ................................................ B60t 8/08
[58] Field of Search ........ 188/181 A, 181 C, 181 T; 235/183; 303/21 A, 21 BB, 21 BE, 21 C, 21 CG, 21 F, 20; 307/218, 120, 10 R, 109; 317/5; 318/52; 324/161–162; 340/263, 53, 62; 320/1

[56] References Cited
UNITED STATES PATENTS

| | | | |
|---|---|---|---|
| 3,150,324 | 9/1964 | Hallden et al. | 307/218 |
| 3,362,757 | 1/1968 | Marcheron | 303/21 A |
| 3,398,995 | 8/1968 | Martin | 303/21 A |
| 3,401,984 | 9/1968 | Williams et al. | 303/21 A |
| 3,467,443 | 9/1969 | Okamoto et al. | 303/21 BE |
| 3,469,662 | 9/1969 | Dewar | 303/21 |
| 3,494,671 | 2/1970 | Slavin et al. | 303/21 A |
| 3,498,682 | 3/1970 | Mueller et al. | 303/21 BE |
| 3,508,795 | 4/1970 | Scharlack et al. | 303/21 A |
| 3,532,392 | 10/1970 | Scharlack | 303/21 BE |
| 3,532,393 | 10/1970 | Riordan | 303/21 BE |
| 3,578,819 | 5/1971 | Atkins | 303/21 P |

FOREIGN PATENTS OR APPLICATIONS

| | | | |
|---|---|---|---|
| 909,255 | 10/1962 | United Kingdom | 303/21 BE |

Primary Examiner—Trygve M. Blix
Assistant Examiner—Stephen G. Kunin
Attorney, Agent, or Firm—Harness, Dickey & Pierce

[57] ABSTRACT

A system for controlling the braking of a wheeled vehicle to prevent skidding in which relief of the braking force applied to the vehicle wheels is effectively responsive to a critical slip signal, the signal being generated in response to a sensed difference between a hypothetical vehicle deceleration as approximated by a decreasing ramp signal and the vehicle wheel speed. This comparison is made on a differential basis to provide an output signal which is utilized in controlling an output gate. The braking force is reapplied upon the sensing of a positive wheel acceleration signal and a change in the sign of the rate of change of wheel acceleration from a positive to a negative value. During this period the slip signal is ineffective to control the braking force.

9 Claims, 2 Drawing Figures

PATENTED JUL 29 1975          3,897,114
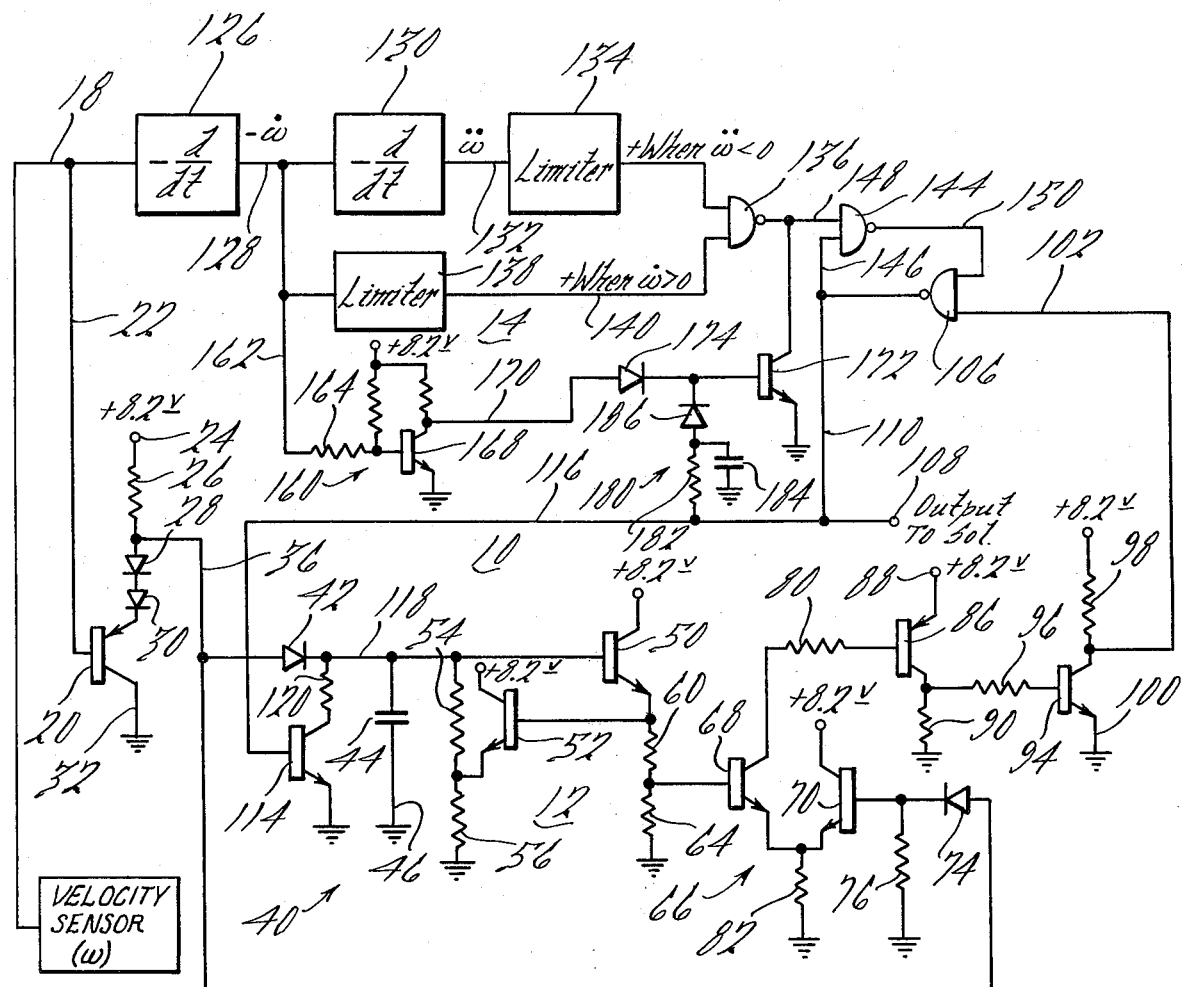
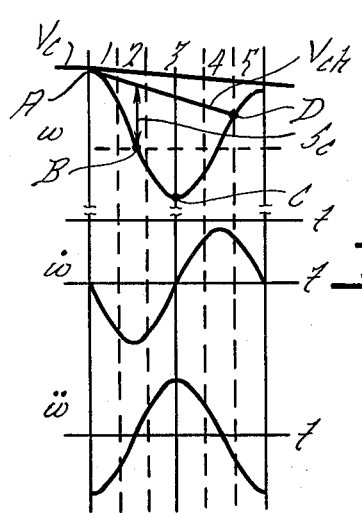
FIG. 1.
FIG. 2.
INVENTOR.
Ronald S. Scharlack
BY
Harness, Dickey & Pierce
ATTORNEYS.

SKID CONTROL SYSTEM

BACKGROUND AND SUMMARY OF THE INVENTION

This invention relates generally to vehicle braking systems and, more particularly, to a brake control means for preventing wheel skidding and for minimizing stopping distances while simultaneously maintaining directional stability through a system which senses, on the run-down portion of the cycle, a critical slip and, on the spin-up side of the cycle, a positive wheel acceleration and a change in sign of the rate of change of the wheel acceleration signal.

For purposes of describing the system of the present invention, the terms "slip" refers to a characteristic of the rotating element whereby the element rotates at less than its free rolling speed when a braking force or torque is applied. In the context of the system, this slip may be approximated by a hypothetical measure of the vehicle speed and comparing this vehicle speed to a sensed wheel speed. The term "skid" or "slide" refers to a locked wheel condition.

One of the major difficulties which arises in braking a moving vehicle, such as an automobile, an aircraft or other wheeled vehicle, occurs when the braking wheel, or wheels, skid or slide, this skid tending to create an unstable condition in the controlled motion of the vehicle. Wheel lock-up may cause such a loss in directional stability as to result in an uncontrolled skidding or sliding while at the same time the presence of locked wheels generally increases the distance required to stop due to the reduced coefficient of friction while skidding. Under most road conditions, if skidding can be prevented, the vehicle can usually be stopped more safely in a shorter distance.

Several skid control systems have been involved which are effective under various road conditions to minimize stopping distance while maximizing the directional stability of the vehicle, these systems utilizing a relatively simple computational system. In one system, disclosed in an application by Ronald S. Scharlack, Ser. No. 769,035, now U.S. Pat. No. 3,532,392, the velocity of the braking wheel or wheels is sensed by appropriate angular speed sensing devices and, by utilizing simple gating logic, circuit elements responsive only to changes in the polarities of such output signals, a control signal can be produced and applied to the braking system of the vehicle which provides the desired effect. In this system, the circuit is arranged to maintain a minimum rate of change of braking force as a function of slip so that ideally such rate of change is always maintained substantially at or near zero independently of the road conditions which exist.

Another system is disclosed in copending application of David B. Eisenhaure and Ronald s. Scharlack, Ser. No. 626,626, now U.S. Pat. No. 3,508,795, which utilizes the linear and angular accelerations of the braking wheel as sensed by appropriate accelerometer devices. The output signals from such accelerometers are fed to a simple analog computer system which produces output signals proportional to the rate of change of the braking force as a function of time and to the rate of change of the wheel slip as a function of time. The above mentioned systems are cited here for background purposes and are incorporated herein by reference.

The system of the present invention utilizes a different mode of operation in controlling the relief of the brake pressure to permit spin up of the wheels and avoid an incipient skid condition. This is accomplished by generating a hypothetical signal which is representative of the vehicle deceleration, this signal being readjusted each time the wheel starts a run down mode of operation upon the application or reapplication of the braking force. This vehicle speed signal is compared, through suitable differential circuits, with a signal representative of the wheel speed. Appropriate circuit elements are incorporated into the system to derive a critical slip differential signal which maintains the inoperability of the slip responsive portion of this system until such time as a critical slip is reached. This critical slip is defined as a preselected magnitude of variation of the vehicle wheel speed from the hypothetical vehicle speed. The vehicle speed is permitted to continue after the release of the brake pressure until such time as the wheel speed exceeds the hypothetical vehicle speed at the same point in time.

The vehicle speed signal is then raised to the peak or reaches the maximum positive inflection point at which time the hypothetical vehicle speed ramp is again generated. The reapplication of the brake force occurs when the wheel acceleration is positive and the rate of change of wheel acceleration switches from a positive to a negative value. These latter signals are generated in a separate portion of the circuit to provide a controlling output signal for reapplication of the brake pressure. During this portion of the cycle, the critical slip circuit is inoperative to control the operation of the brake system. However, the slip circuit output is still being fed to the output gate. Thus, a circuit is provided to insure that the slip circuit output remains at a particular level during the spin-up portion of the cycle.

From the foregoing description, it is seen that an improved slip approximation circuit has been evolved wherein the vehicle speed is approximated by variably selectable circuit elements, the selection of the circuit elements being accomplished, in certain circumstances, to closely approach the actual vehicle speed, or in other circumstances to intentionally distort the vehicle speed to vary the response of the circuit when two signals are being compared, as for example the vehicle speed approximation signal and the wheel speed signal. In this way the response of the circuit in relieving the brakes, for example, may be varied. Also a fixed critical slip point signal may be generated incorporating certain features of the present invention. Further, the circuit may be evolved to operate on a selected percentage of vehicle speed by varying the response point of the circuit.

Accordingly, it is one object of the present invention to provide an improved system for operating the brakes of a wheeled vehicle.

It is another object of the present invention to provide an improved skid control system for the brake or brakes of a wheeled vehicle.

It is still a further object of the present invention to provide an improved brake control system of the type described which is capable of eliminating skidding or sliding of the brake wheel by sensing a critical slip signal.

It is another object of the present invention to provide an improved skid sensing system.

It is still a further object of the present invention to provide an improved skid sensing system which incorporates a circuit for generating a hypothetical vehicle speed signal.

It is still another object of the present invention to provide an improved skid control system which incorporates a novel system for generating a critical slip signal.

It is a further object of the present invention to provide an improved skid control system which generates a slip signal in response to a function of the wheel speed and hypothetical vehicle speed signal.

It is still a further object of the present invention to provide an improved slip circuit which utilizes a variable function generator for approximating the vehicle speed and compares this signal to a wheel acceleration signal.

It is still a further object of the present invention to provide an improved method of generating a differential signal in the slip circuit described above.

It is another object of the present invention to provide an improved system for detecting a high acceleration to override the control system.

It is still a further object of the present invention to provide an improved system for controlling a skid control unit in response to the lapse of a preselected time.

It is still a further object of the present invention to provide an improved system for use in connection with reapplying the brake pressure to be utilized in conjunction with the slip circuit described above.

It is still a further object of the present invention to provide an improved logic system incorporating the slip circuit described above.

Further objects, features and advantages of this invention will become apparent from a consideration of the following description, the appended claims, and the accompanying drawings in which:

FIG. 1 is a schematic diagram illustrating a representative skid control system incorporating the features of the present invention; and FIG. 2 is a combination graph of the wheel speed, wheel acceleration and rate of change of wheel acceleration vs. time and further illustrating a representative hypothetical vehicle speed curve or ramp generated by the system of the present invention.

The skid control system of the present invention is particularly adapted to be utilized and will be described specifically for use with an automotive vehicle. However, it is to be understood that the features of the invention may be utilized with other types of vehicles including aircraft and other wheeled vehicles which are adapted to provide braking through a wheel type of element. In the case of an automotive use, the system of the present invention may be utilized in connection with either the front wheels, the rear wheels or both the front and rear wheels. However, for simplicity, the system will be described for use in conjunction only with the rear wheels of an automotive vehicle.

Referring now to the drawings and particularly to FIG. 1 thereof, there is illustrated a skid control circuit 10 which includes a slip and vehicle signal generating circuit 12 utilized to control the release of the brakes on the run-down portion of the stopping cycle and a wheel acceleration and rate of change of wheel acceleration signal generating circuit 14 which is utilized in reapplying the brakes. Particularly, the circuit 12 includes an input from a wheel velocity sensing transducer (not shown) which provides a wheel velocity input signal $\omega$ to an input conductor 18. This signal is fed to an input amplifier transistor 20, and particularly to the base electrode thereof, by means of a conductor 22. The emitter-collector circuit of the transistor 20 is connected to a positive source of d.c. potential at terminal 24 through a resistor 26 and a pair of diodes 28 and 30. The collector electrode of transistor 20 is grounded at 32.

The transistor 20 is biased such that the entire wheel velocity signal, as illustrated in the upper portion of FIG. 2, is transmitted through to the output conductor 36 connected to the junction between the upper diode 28 and the resistor 26. The diagram of FIG. 2 illustrates a portion, and particularly one cycle, of the wheel velocity signal as impressed on conductor 36, it being understood that the wave form is shown purely for illustrative purposes and may not exactly picture the wheel velocity wave form. The wave form impressed on conductor 36 is fed to a vehicle speed ramp generating circuit 40. The circuit generates a ramp voltage which merely approximates the actual vehicle speed. This ramp voltage may be selected to be of any configuration desired and, in the particular illustrated embodiment, the ramp is chosen to be one unit of gravity deceleration rate of the vehicle.

Particularly, the signal on conductor 36 is fed through a diode 42 to a capacitor 44, the opposite plate of the capacitor being grounded at 46. Thus, as long as the voltage on conductor 36 exceeds the voltage on capacitor 44, current will be fed to the capacitor 44. Thus, the capacitor is initially charged to a voltage which is representative of the unbraked wheel speed.

Referring now to the wheel velocity diagram in FIG. 2, it is seen that the vehicle speed initially starts as a flat constant velocity which commences deceleration during periods 1, 2, 3, 4 and 5 as the wheel is braked and subsequently spun up to a second maximum wheel velocity point. Accordingly, the capacitor 44 is charged to a voltage which is a function of the wheel velocity signal at point A. Upon deceleration of the wheel toward point B, the wheel velocity signal is less than the charge on the capacitor 44 due to the slow discharge circuit of capacitor 44 to be described hereinafter. Accordingly, the discharge circuit of capacitor 44 will cause the voltage on capacitor 44 to follow a line $V_{ch}$, being the hypothetical car velocity, in this case a 1 gravity deceleration. However, the wheel velocity is rapidly decreasing due to the braking force applied to the wheels.

Referring back to FIG. 1, the capacitor is seen to discharge through a circuit including a transistor 50 and a transistor 52 and also a voltage divider circuit including a resistor 54 and a resistor 56. Particularly, current flows through the base- emitter circuit of transistor 50, the base-emitter circuit of transistor 52 and then to ground through the resistor 56. The base-emitter drops create a constant voltage across resistor 54 due to the constant voltage of base-emitter diode drops of transistor 50 and 52. Accordingly, a voltage is fed to a voltage divider circuit, including resistors 60, 64, the resistors 60, 64 being chosen to provide a preselected percentage of the vehicle velocity signal to one input circuit of a differential amplifier system 66. It is to be noted that the velocity signal being fed to the one input circuit of the differential amplifier 66 is directed through two diode drops, including diode 42 and the base-emitter circuit of transistor 50, this signal being fed to the base circuit of transistor 68 of the differential amplifier circuit 66.

On the other hand, the wheel velocity signal is also fed to the other input terminal of the differential amplifier circuit 66, and particularly, to the base circuit of a transistor 70 through a conductor 72 and a diode 74. This voltage is developed across a resistor 76 which is connected between the base electrode of transistor 70 and ground. In this case it is to be noted that the wheel velocity signal is directed through a single diode drop, particularly diode 74.

The differential amplifier circuit 66 is of the conventional type and includes an output circuit, in this case a current limiting resistor 80, and the two emitter electrodes of transistors 68 and 70 are connected to ground through a resistor 82. When the car velocity signal fed to transistor 68 is sufficiently above the wheel velocity signal, in this case determined by the voltage divider resistor 60, 64, and the two diodes drops across the diode 42 and the transistor 50 in the case of the vehicle velocity signal and the voltage drop of the diode 74 in the case of the wheel velocity signal, the transistor 68 will be nonconductive and the transistor 70 will be conductive. However, when the wheel velocity signal drops by a preselected amount, designated $S_c$ in the upper portion of FIG. 2, below the decreasing ramp voltage, the transistor 68 will be rendered conductive and the transistor 70 will be rendered non-conductive. This differential operation creates a critical slip speed signal which is a function of the wheel velocity and the vehicle velocity ramp signals.

When this critical slip is reached, the output signal from the transistor 68 is fed to an inverter amplifier transistor 86, the emitter of which is connected to a positive 8.2 volt potential at terminal 88 and the collector of which is connected to ground through a resistor 90. This critical signal causes transistor 86 to conduct to provide an output signal to a second inverter transistor 94 through a resistor 96. The second transistor 94 is connected to a positive 8.2 volt potential through a resistor 98 and to ground potential at 100. The conduction of transistor 86 causes normally non-conductive transistor 94 to conduct thereby grounding the output conductor 102 connected to the collector electrode of transistor 94.

The signal on conductor 102 is fed through an "and " gate circuit 106 which has the characteristics that two positive signals into the input thereof will create a zero output signal and all other signal conditions will create a positive or logical one output signal, as for example, any zero input or both inputs being zero. This output signal from gate 106 is fed to an output terminal 108 connected to the brake actuator solenoid through a conductor 110. The brake actuator solenoid may take any form, as for example that illustrated in copending application of William Stelzer, Ser. No. 702,095, filed Jan. 31, 1968, now U.S. Pat. No. 3,495,882, or 783,794 filed Dec. 16, 1968, now U.S. Pat. No. 3,560,056. In this particular situation, a positive output signal on output terminal 108 will energize the solenoid to remove the brake pressure being fed to the wheels of the vehicle. In this way, the braking force is eliminated from the wheels and the wheels will start the spin-up portion of the cycle.

In the particular embodiment illustrated, the output signal is fed back to a disabling transistor 114 through a conductor 116. This positive signal will cause the normally non-conductor transistor 114 to conduct, thereby grounding conductor 118 through the collector-emitter circuit of transistor 114 and the resistor 120. This will rapidly discharge the capacitor 44 to disable the slip circuit. As will be seen from a further description of this system, the logic circuit, including gate 106, is designed to latch the output on until such time as certain conditions are sensed in the acceleration and rate of change of acceleration circuit 114. Thus, the disabling of the slip circuit will not effect the output signal being fed to the solenoid. It is to be understood that the disabling circuit, including conductor 116, transistor 114 and resistor 120 may be eliminated in certain configurations of skid control systems.

Referring now to the upper portion 14 of the circuit, the wheel velocity signal $\omega$ impressed on conductor 18 is fed to a first differentiator circuit 126 which provides the negative differential of the wheel velocity signal on output conductor 128. This signal is fed through a second negative differential circuit 130 to provide a rate of change of wheel acceleration signal on output conductor 132. This latter signal is fed through an inverter limiter circuit 134 and fed to an output "and" gate 136. Similarly, the negative wheel acceleration signal $\dot{\omega}$ is fed through a second inverter limiter circuit 138, the output of the limiter circuit 138 being fed to the input circuit of the "and" gate 136 by means of conductor 140.

As stated above, the slip circuit provides a logical zero input signal to the gate 106 to provide a logical one output signal from the gate 106 and on conductor 110. This output signal is also fed to the input circuit of a third gate 144 by means of a conductor 146. Thus, gate 144 is responsive to the signals on conductor 146 and a conductor 148. The input signal to gate 136 from the limiter 138 is positive when $\dot{\omega}$ or the rate of change of acceleration signal is less than zero. On the other hand, the signal on conductor 140 is at a logical one level when the wheel acceleration of $\dot{\omega}$ signal is greater than zero.

Referring now to the two lower graphs in FIG. 2, it is seen that $\dot{\omega}$, or the wheel acceleration signal, is negative or less than zero for the entire first half of the wave. On the other hand, the rate of change of acceleration signal or $\ddot{\omega}$ is negative during the first 90° of the wave form and is positive during the second 90° of the wave form. Accordingly, the signal on conductor 140 will be a zero during the whole first half of the cycle and the signal on the upper conductor from the limiter 130 will be positive during the first 90° and zero during the second 90°. Accordingly, the signal on conductor 140 will maintain the output of gate 136 at a logical one level during the entire first half of the cycle. This logical one level signal is fed to the input circuit of the gate 144 as a positive signal.

This positive signal is "anded" with the output signal from the gate 106 to provide a logical zero level signal on an output conductor 150 from the gate 144. This logical zero signal during the first half cycle latches the gate 106 on the "on" condition irrespective of the level of the slip signal on conductor 102. Also, during the third 90° or from 180° to 270°, the $\ddot{\omega}$ or rate of change of acceleration signal is positive or greater than zero to provide a logical zero input to the gate 136. However, the wheel acceleration signal or $\dot{\omega}$, as impressed on conductor 140, switches to a logical one level due to the fact that the ω̇ signal is greater than zero. Thus, this latching of gate 106 is maintained during the first 270° of the cycle.

As was previously stated, the output circuit from the slip circuit 12 is raised to a logical one level due to the disabling of the circuit by means of the signal on conductor 116. This raises the signal level on output conductor 102 to a logical one level when the wheel acceleration signal is greater than zero, during the second 180° of the cycle, and the signal on conductor 140 will be at a logical one level. The signal from the output of limiter 130 changes from a logical zero level during the 180° to 270° portion of the cycle to a logical one level from the 270° to 360° portion of the cycle. Thus, during the last 90° of the cycle, both inputs to the gate 136 will be at a logical one level. At this time, the output from gate 136 switches to a logical zero level which is fed to the input circuit of gate 144. The switching of the signal in conductor 148, from a logical one to a logical zero level, changes the output signal on conductor 150 to a logical one level. This signal is "anded" with the signal on conductor 102 to produce a logical zero level signal at the output of gate 106, which is fed to the output terminal 108 by means of conductor 110. In this way, the output to the solenoid is turned off to reapply the brake pressure, and thus the braking force, during the selected part of the spin-up portion of the cycle, particularly at the 270° point. This logical zero level signal is also fed back to the transistor 114 to enable the vehicle speed ramp circuit and particularly to permit the charging of capacitor 44.

In operation, the wheel velocity signal is fed to the transistor 20 and then to the capacitor 44 by means of diode 42. The capacitor is charged to the maximum wheel velocity voltage indicated by point A on FIG. 2 of the drawings. As the wheel velocity signal starts dropping off toward point B during the run down portion of the cycle, the diode 42 is back biased to stop the flow of current from conductor 36. The capacitor then starts the discharge portion of the cycle through the base-emitter circuits of transistors 50, 52 and the resistor 54. This produces a per cent of vehicle velocity signal at the base electrode of transistor 68, forming half of the differential amplifier circuit 66. The wheel velocity signal is also fed to the input circuit of transistor 70 by means of conductor 72 and diode 74.

When the critical difference between the vehicle velocity ramp signal on capacitor 44 and the wheel velocity signal on conductor 72 is achieved, the conductive condition of transistor 68 and 70 is switched to produce an output signal at conductor 102 through inverter amplifiers 86, 94. This signal causes gate 106 to produce a logical one output signal, which output signal is fed to the output terminal 108. This logical one or solenoid "on" signal at the output terminal 108 is latched to this "on" state because of the action of gate 136 wherein one or other of the signals from either limiter 130 or 132 is at a logical zero level to produce a one level signal at the input of gate 144 on conductor 148. This signal is "anded" with the signal on conductor 146 being fed back from the output terminal 108. The output of gate 144 is fed to the input circuit at gate 106 by means of conductor 150, this signal being a logical zero level to latch the gate 106 in the logical one output configuration.

The upper portion of the circuit includes a pair of differential circuits 126, 130 which provides a rate of change of vehicle acceleration signal from the output of limiter 130. Similarly, a wheel acceleration signal is provided from limiter 138. These two signals are "anded" at gate 136 and when both are a logical one level, a logical zero level signal is produced at the output terminal of gate 136. This occurs when the rate of change of wheel acceleration signal changes from a positive to a negative value, which occurs at the 270° point. this logical zero level signal is fed to the input circuit of gate 144 which produces a logical one level signal on conductor 150. This logical one level signal on conductor 150 is "anded" with the signal on conductor 102. As was stated above, the slip circuit is disabled by means of a logical one signal on conductor 116 to produce a logical one signal on conductor 102 after the energization of the solenoid or release of the brake pressure. The logical one signals on conductors 102 and 150 are "anded" by gate 106 to produce a logical zero output signal at output terminal 108. This signal is also fed back to the transistor 114 to enable the slip circuit.

Certain other features have been provided in the system illustrated to insure that an extremely high acceleration signal will cause the brakes to be reapplied and also to insure that the brakes will not be relieved for an excessive period of time. Particularly, an acceleration sensing circuit 160 senses the wheel acceleration on conductor 128 by means of a conductor 162 and a resistor 164. This signal is fed to the base circuit of a transistor 168, the transistor 168 being normally conducted. When an excessive wheel acceleration condition is sensed, a threshold level is set up by the circuit illustrated, the transistor 168 is turned off to produce a logical one output signal on conductor 170. This is fed to the base electrode of a transistor 172 by means of diode 174 to cause the transistor 172 to become conductive. The conduction of transistor 172 immediately grounds conductor 148 to provide a logical zero input signal to the gate 144. This logical zero signal produces the logical one signal on conductor 150 which is "anded" with the logical one signal on conductor 102 to turn off the solenoid and reapply the brake pressure.

A similar situation exists when an excessive time after release of the brake pressure is sensed by means of a timing circuit 180. The timing circuit includes a resistor 182 and a capacitor 184, the capacitor 184 being charged from the logical one output signal at an output terminal 108 during the spin-up portion of the cycle. The timing of the circuit is determined by the value of resistor 182 and capacitor 184. When the capacitor 184 has charged sufficiently to forward bias a diode 186, a logical positive one level signal is fed to the transistor 172 to cause the transistor 172 to conduct. Again, this immediately grounds conductor 148 to reapply the braking pressure.

While it will be apparent that the embodiment illustrated herein is well calculated to fulfill the objects above stated, it will be appreciated that the present invention is susceptible to modification, variation and change without departing from the proper scope or fair meaning of the subjoined claims.

What is claimed is:

1. In a skid control system for controlling the application and release of brake pressure to at least one wheel of a vehicle, the improvement comprising sensing means for sensing the wheel angular velocity, generating means for generating a signal which is an approximation of the vehicle velocity from said wheel velocity signal and comparator circuit means for deriving a slip signal in response to said wheel and vehicle velocity signals, said generating means including means connected to said wheel velocity sensing means for establishing a characteristic of said vehicle velocity curve including establishing a starting point for said signal from said wheel velocity sensing means and means for decreasing said vehicle velocity signal independently of the actual vehicle velocity in accordance with a preselected curve when said curve is below said starting point by a preselected amount, said comparator circuit including differential circuit means for comparing the vehicle velocity signal with the wheel velocity signal during the braked portion of the cycle for stopping the vehicle and deriving an output signal when said wheel velocity signal bears a preselected relationship to the vehicle velocity signal, said vehicle velocity signal being a linearly decreasing ramp, said system further including a charge storage device, said charge storage device being supplied with electrical energy when said wheel velocity signal bears a preselected relationship to the charge on said storage device, said preselected relationship occurring when the wheel velocity signal exceeds the charge on said storage device, said system further including a circuit for discharging said storage device when said wheel velocity signal is less than the charge on the storage device, the discharge circuit causing the discharge of said storage device in accordance with a preselected deceleration relationship to approximate the deceleration of the vehicle, means for giving greater effect to said vehicle velocity signal as compared to said wheel velocity signal to create a differential between said signals, said differential creating circuit means including a fixed voltage drop circuit in said vehicle velocity signal generating circuit and a fixed voltage drop circuit in said wheel velocity signal generating circuit, the fixed drop of said vehicle velocity circuit exceeding that of said wheel velocity circuit, means for generating an output signal when said wheel velocity signal falls a preselected magnitude below said vehicle velocity signal to create a critical slip signal, an output circuit for controlling the application of brake pressure, said critical slip signal providing an output signal to release brake pressure when a critical value is obtained, and slip circuit disabling means connected in responsive relationship to said output circuit, said disabling means operating to disable the slip circuit when said output signal is generated, said critical slip signal causing a brake relieving condition which relieves brake pressure on the vehicle wheels, said skid control system further including pressure applying circuit means including first signal generating circuit means responsive to said wheel velocity signal for generating a rate of change of wheel acceleration signal and second circuit means for generating a wheel acceleration signal and output gate means correlating said rate of change of wheel acceleration signal and said wheel acceleration signal to control the reapplication of brake pressure to the wheels.

2. The improvement of claim 1 further including latching circuit means for latching the output circuit to said brake relieving condition in response to the output signal from said output gate means and said output signal.

3. The improvement of claim 2 wherein said output signal is latched for at least the first 180° of said vehicle deceleration cycle.

4. The improvement of claim 3 wherein said gate circuit has a first and second output state, said gate circuit being in said first output state when said rate of change of wheel acceleration signal and said wheel acceleration signal are of preselected polarities.

5. The improvement of claim 4 wherein said gate circuit includes an "and" gate and said conductive states are a logical zero and one, respectively.

6. The improvement of claim 5 wherein said output gate switches to said second state in response to a change in polarity of said rate of change of wheel acceleration signal.

7. The improvement of claim 6 wherein the output of said gate circuit is "anded" with the critical slip signal after said slip circuit is disabled to produce a brake pressure relieving signal upon said change in polarity of said rate of change of wheel acceleration signal.

8. The improvement of claim 7 further including a high acceleration override circuit responsive to said wheel acceleration signal, said high acceleration circuit having a threshold level corresponding to a preselected magnitude of wheel acceleration, said high acceleration override circuit generating a signal for reapplying brake pressure upon achieving said threshold level.

9. The improvement of claim 8 further including a time-out override circuit having a preselected time cycle, said timing cycle being initiated upon sensing said brake pressure relieving signal, said timing override circuit generating a brake pressure reapplying signal upon the lapse of a preselected time.

* * * * *